United States Patent

[11] 3,530,886

| [72] | Inventor | Walter J. Zoya<br>Troy, Michigan |
|---|---|---|
| [21] | Appl. No. | 687,868 |
| [22] | Filed | Dec. 4, 1967 |
| [45] | Patented | Sept. 29, 1970 |
| [73] | Assignee | Sperry Rand Corporation<br>Troy, Michigan<br>a corporation of Delaware |

[54] HYDRAULIC CONTROL VALVE
8 Claims, 4 Drawing Figs.

| [52] | U.S. Cl. | 137/609,<br>239/265.17 |
|---|---|---|
| [51] | Int. Cl. | F17d 1/10,<br>B63h 25/46 |
| [50] | Field of Search | 137/609,<br>608 (Cursory); 239/265.17, 265.27 |

[56] References Cited
UNITED STATES PATENTS

| 2,777,466 | 1/1957 | Ericson | 137/609X |
| 3,058,489 | 10/1962 | Corbett | 137/609X |
| 3,111,130 | 3/1963 | Caldwell | 137/608 |
| 3,128,602 | 4/1964 | Salemka | 239/265.17 |
| 3,205,656 | 9/1965 | Elverum | 137/609X |
| 3,310,069 | 3/1967 | Hoffman | 137/609X |

*Primary Examiner*—James Kee Chi
*Attorney*—Van Meter and George

ABSTRACT: A directional control valve having in combination a plurality of pressure responsive valve mechanisms for selectively closing communication between a fluid inlet and a plurality of fluid outlets and a linking mechanism which mechanically connects the said plurality of valve mechanisms to each other.

Patented Sept. 29, 1970

INVENTOR.
WALTER J. ZOYA
BY
Van Metre and George

ATTORNEYS

INVENTOR.
WALTER J. ZOYA

INVENTOR.
WALTER J. ZOYA

3,530,886

HYDRAULIC CONTROL VALVE

BACKGROUND OF THE INVENTION

This invention relates to power transmissions, particularly to those of the type comprising two or more fluid pressure energy translating devices, one of which may function as a pump and another as a fluid motor.

The invention is generally concerned with a pilot valve operated directional control valve mechanism for controlling the direction of fluid in such transmission systems. In particular, this invention relates to a unique valving mechanism in which the inlet flow to the valve can be selectively diverted to any of a plurality of discharge ports. Specifically, this invention relates to a pneumatic mechanical control thrust assembly which selectively directs high temperature gas to any of a plurality of thrust rocket nozzles.

In the past, it has been customary to use in such high temperature gas directional control systems, a pilot operated directional control valve which is generally designed to direct flow to one of two rocket nozzles. In present day missile applications, four such rocket nozzles are circumferentially spaced around the missile and used to obtain proper guidance for the missile direction, thus two separate control valves are required. An effective control of the missile direction may be obtained by employing three nozzles, however two directional control valves would still be required to selectively control the flow of gas to the rocket nozzles.

The control valves used in the past have functioned in an acceptable manner, however they employ sliding valve elements which require a close clearance sliding fit which is sensitive to propellant contamination which may lead to possible damage or seizure of the sliding elements. Such valves also require the use of propellant filters, thus adding undesirable weight to the missile.

In addition, such valves are commonly designed such that the pilot control flow and internal leakage are exhausted overboard, thus increasing the total system pneumatic losses.

Further, due to the special requirement of compactness for missile applications, such valves have their electrical actuating controls in close proximity to the high temperature gas, and thus there exists a possibility of damage or inoperativeness of such electrical controls.

In addition to compactness of design in missile applications, such missiles have a limited amount of electrical power available for use, thus employing a plurality of control valves reduces the effective electrical power available.

SUMMARY OF THE VENTION

This invention comprises a directional control valve having a plurality of pressure responsive valves mechanically linked which are adapted to selectively open and close communication between an inlet port and a plurality of outlet ports.

It is therefore an object of this invention to provide a unique and improved directional control valve.

It is also an object of this invention to provide a directional control valve in which all pilot control flow and internal leakage is collected and utilized for the output.

It is also an object of this invention to provide a directional control valve having no close clearance sliding fits, thus minimizing damage and possible seizure.

It is also a purpose of this invention to provide a directional control valve which is relatively insensitive to propellant contamination.

It is also a purpose of this invention to provide a directional control valve in which the electrically actuating elements are generally remote from the main flow.

It is also a purpose of this invention to provide a directional control valve having a minimum electrical power consumption.

It is a further purpose of this invention to provide a directional control valve which may selectively direct flow from an inlet to a plurality of outlets which is compact and economical to manufacture, and which is efficient in operation over a long life.

Further objects and advantages of the present invention will be apparent from the following description, reference being had to the accompanying drawings wherein a preferred form of the invention is clearly shown.

IN THE DRAWINGS

Figure 1:
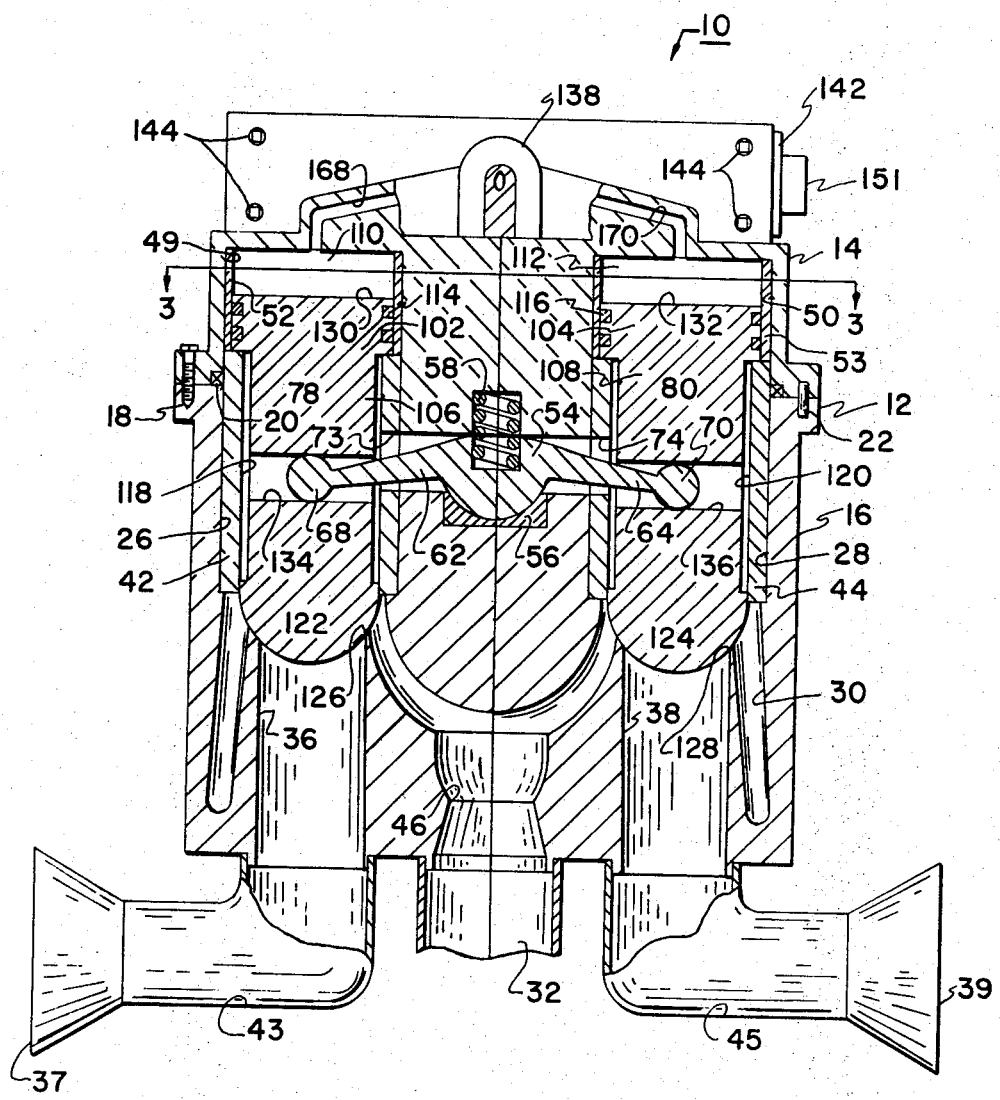
FIG. 1 illustrates a partially sectioned view of a directional control valve embodying a preferred form of the present invention taken along line 1-1 of FIG. 3.
Figure 2:
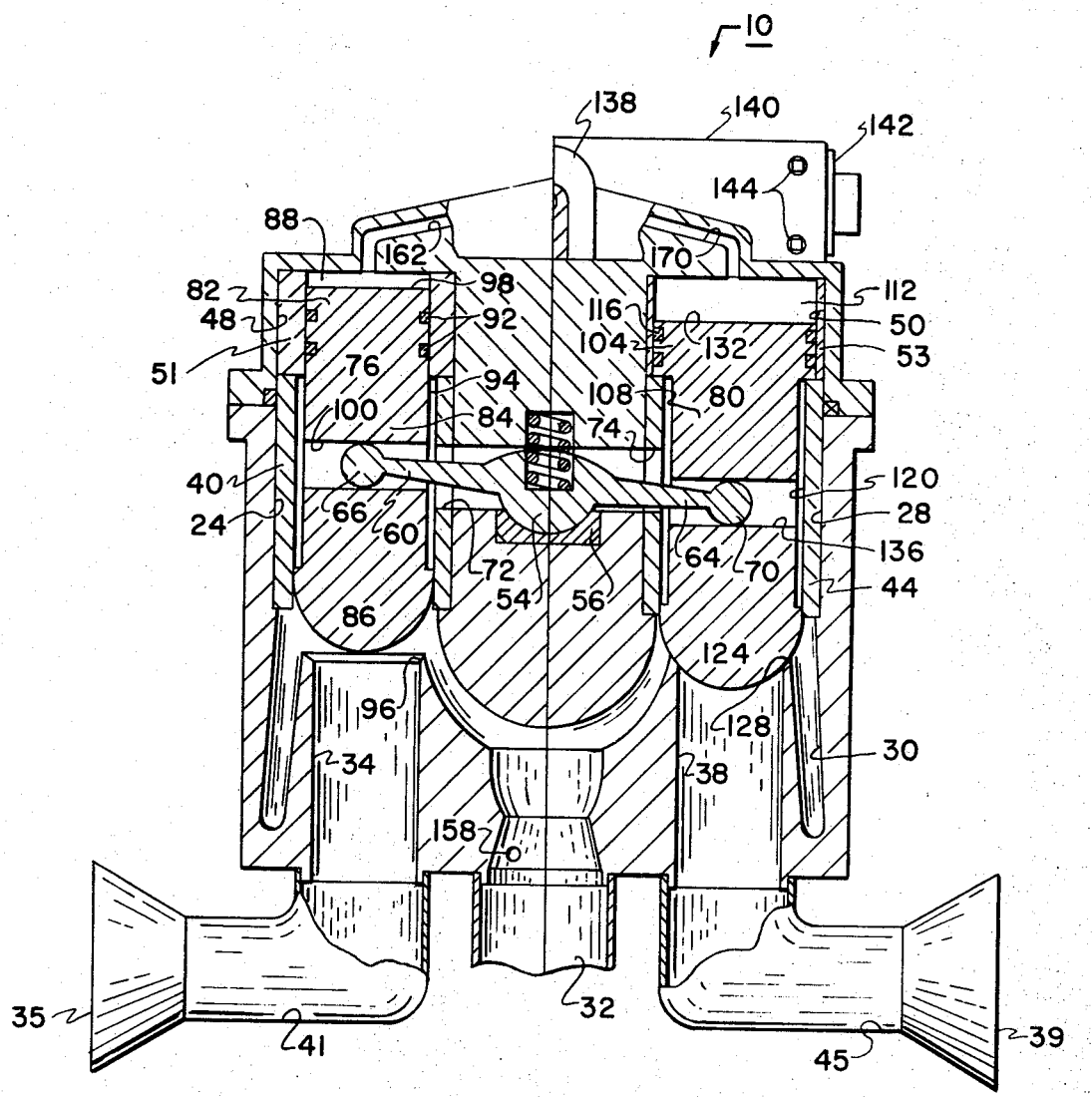
FIG. 2 illustrates a partially sectioned view of a directional control valve taken along line 2-2 of FIG. 3.
Figure 3:
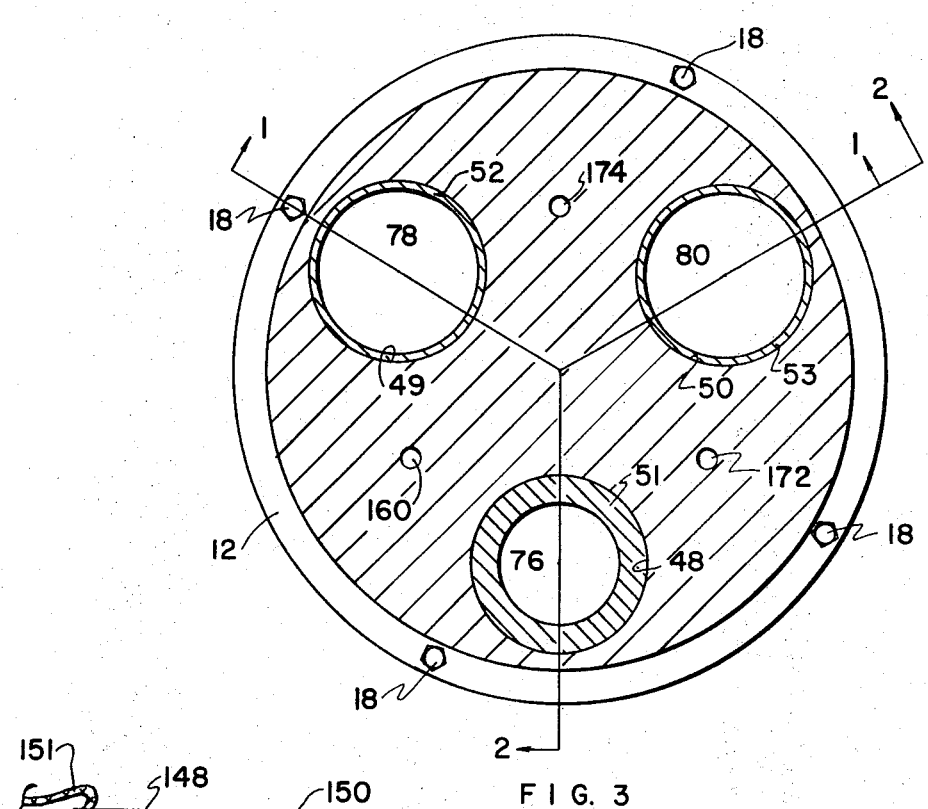
FIG. 3 illustrates a partially sectioned view of a directional control valve taken along line 3-3 of FIG. 1.

Referring now to the drawings, the embodiment of the invention selected for illustration comprises a directional control valve 10 having a housing 12 which comprises two parts 14 and 16 secured together by bolts 18, one of which is shown in FIG. 1. A static seal 20 insures a fluid tight juncture of the two parts and the dowel pin 22 maintains proper angular alignment between them.

A plurality of circumferentially spaced bores 24, 26, and 28 in part 16 of housing 12 provide a fluid chamber 30 which connects a fluid inlet 32 with a plurality of fluid outlets indicated by the numerals 34, 36, and 38. The fluid outlets 34, 36, and 38 are circumferentially spaced about the fluid inlet 32 and are respectively circumferentially aligned with bores 24, 26, an 28. The outlets may be connected to a pressure energy translating device (not shown) for use by the same, or, as illustrated, the outlets 34, 36, and 38 are respectively connected to thrust rocket nozzles 35, 37, and 39 by means of conduits 41, 43, and 45, respectively. Disposed within bores 24, 26, and 28 are carbon sleeves 40, 42, and 44, respectively. The fluid inlet 32 is adapted to be connected to a source of pressure fluid such as the propellant exhaust of a missile rocket engine, not shown. Within the inlet 32 there is provided a sonic inlet venturi 46 which is adapted to substantially reduce the upstream pressure (hereafter referred to as Ps) of the inlet fluid. This lower pressure which enters the fluid chamber 30 (hereafter referred to as Po) may be approximately one-fourth of Ps.

A plurality of circumferentially spaced bores 48, 49, and 50, respectively having carbon sleeves 51, 52, and 53 disposed therein are provided in part 14 of the housing 12 and are adapted to be circumferentially aligned with the bores 24, 26, and 28 respectively when the parts 14 and 16 are joined together.

A linking mechanism 54, the function of which will be described later, is pivotally carried by a fulcrum 56 between the parts 14 and 16 and is maintained in position by means of a spring 58. The spring 58 serves only to maintain the position of the linking mechanism 54 during time periods when the valve is inoperative. The linking mechanism 54 is provided with three arms, indicated by the numerals 60, 62, and 64 which respectively have spherically shaped outer ends 66, 68, and 70, and which extend radially outward from the fulcrum 56 and respectively through bores 72, 73, and 74 of the carbon sleeves 40, 42, and 44.

There are provided in the circumferentially aligned bores, valve members 76, 78, and 80. The valve member 76 has a piston or an end section 82 and a center section 84 of a generally cylindrical shape and of the same outer diameter. An opposite end section 86 is provided having a generally hemispherical shape. The end section 82 is adapted to be slidably mounted in the carbon sleeve 51 of the bore 48 forming an expansible pressure chamber 88 therein. The seals 92 are provided to prevent fluid communication between the pressure chamber 88 and a cavity 94 formed between the carbon sleeve 40 and the outer periphery of the center section 84. Due to the seals 92, the piston 82 is considered as not having a close clearance sliding fit. The hemispherically shaped section 86 is guided by the carbon sleeve 40 and is adapted to engage a valve seat 96 formed on the fluid outlet 34 in response to pressure acting on an end surface 98 of the end section 82. The cavity 94 is in fluid communication with the fluid chamber 30 by means of any suitable passageway, not shown, in housing 12.

The center section 84 of valve member 76 is provided with a cylindrical bore 100 extending radially therethrough and is adapted to receive and be pivotally carried by the linking mechanism spherical outer end 66.

The valve members 78 and 80 are identical and are provided respectively with end sections 102 and 104 of a generally cylindrical shape, having an outer diameter which is larger than the end section 82 of the valve member 76. Each valve member 78 and 80 have, respectively, center sections 106 and 108 of a generally cylindrical shape having outer diameters which are smaller than their associated end section. The end sections 102 and 104 are adapted to be slidably mounted respectively in carbon sleeves 52 and 53 of bores 49 and 50 and respectively forming expansible pressure chambers 110 and 112. The seals 114 and 116 are provided on the end section 102 and 104 respectively to prevent fluid communication between pressure chambers 110 and 112 and cavities 118 and 120 from respectively between the carbon sleeves 42, and 44 and the outer periphery of the center sections 106 and 108. The cavities 118 and 120 are in fluid communication with the fluid chamber 30 by means of any suitable passageways, not shown, in housing 12.

Each valve member 78 and 80 is also provided with opposite end sections 122 and 124, respectively, which have a generally hemispherical shape and as the respective valve member reciprocates within their associated bores, the opposite end section 122 and 124 are guided by the carbon sleeves 52 and 53, respectively. The end sections 122 and 124 are adapted to respectively engage valve seats 126 and 128 formed on the fluid outlets 36 and 38, in response to pressure acting on end surfaces 130 and 132 of end sections 102 and 104, respectively.

It should be noted that the respective end surfaces 130 and 132 of valve members 78 and 80 have substantially the same area under pressure in their associated pressure chambers, while the end surface 98 of the valve member 76 has an area under pressure in its associated pressure chamber which is less than the area of either surface 130 or 132.

The center sections 106 and 108 of valve members 78 and 80 are respectively provided with cylindrical bores 134 and 136 extending radially therethrough and are adapted to receive and be pivotally carried by the linking mechanism spherical outer ends 68 and 70, respectively.

Part 12 includes a servo pilot valve 138, a mounting flange 140 having a solenoid housing 142 secured thereto by any suitable means such as bolts 144.

Figure 4:
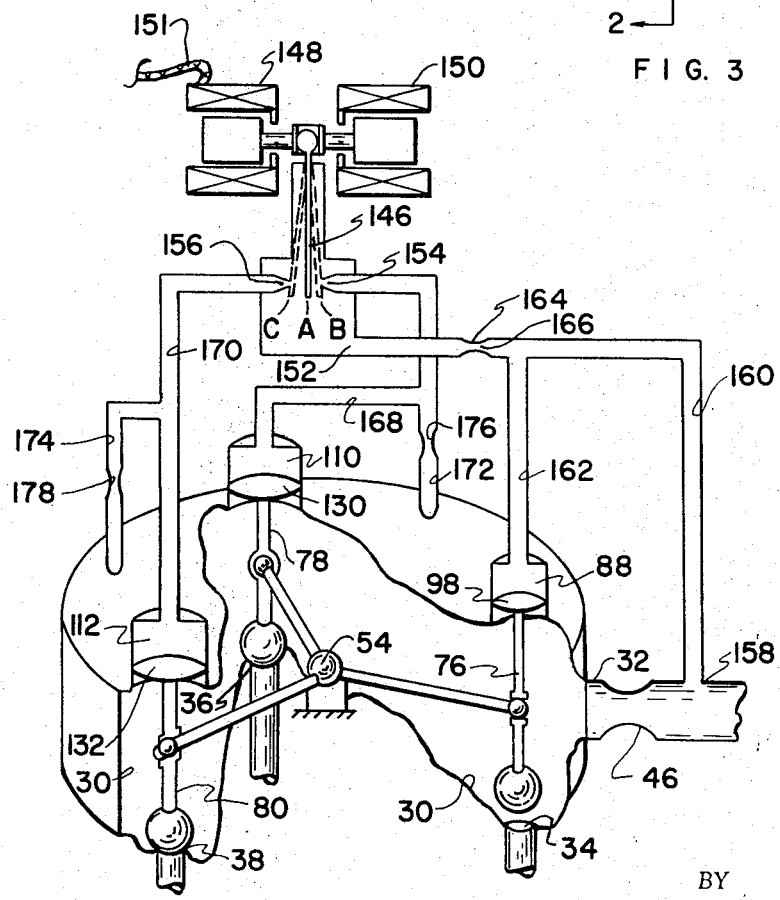
FIG. 4 illustrates a diagrammatic view of the directional control valve illustrated in FIG. 1.

The servo pilot valve contains a servo flapper 146 (FIG. 4) which is mechanically attached to and actuated by solenoids 148 and 150 contained in the solenoid housing 142. The solenoids are attached to a source of electrical energy (not shown) by means of electrical connector 151. The servo pilot portion has an inlet port and two outlet ports indicated respectively by the numerals 152, 154, and 156. The flapper 146 is adapted to be actuated by the solenoids 148 and 150 to selectively restrict the effective areas of the outlet ports 154 and 156, thus creating a variable orifice which may restrict the flow of fluid to either outlet by a predetermined amount. The inlet port 152 is connected to the fluid inlet 32 upstream or at a point 158 ahead of the sonic inlet venturi 46 by means of a fluid conduit 160. The fluid conduit 160 is also connected to the pressure chamber 88 by means of conduit 162, thus permitting fluid at pressure Ps to act directly on the end surface 98 of the valve member 76.

Upstream of, or at a point 164 beyond, the conduit 162, a fixed orifice 166 is provided in conduit 160. This orifice 166 is designed to reduce the inlet pressure Ps to some intermediate value (hereafter referred to as Pc) which is approximately one-half of Ps. Thus, the pressure of the fluid entering the servo pilot valve 138 through inlet 152 is Pc.

The servo valve outlet ports 154 and 156 are connected respectively to the pressure chambers 110 an 112 by means of conduit 168 and 170 respectively, thus permitting fluid at pressure Pc to act directly on the end surfaces 130 and 132 of the valve members 78 and 80, respectively, when the servo flapper 146 is actuated in the manner herebefore described.

The conduits 168 and 170 are connected to the fluid chamber 30 by means of conduits 172 and 174, respectively. There are provided in conduits 172 and 174 fixed orifices 176 and 178, respectively, which are adapted to reduce the pressure Pc to that of the fluid chamber pressure Po.

In operation, the directional control valve 10 may selectively direct fluid entering the valve through fluid inlet 32 to one of the fluid outlets 34, 36, and 38. It should be noted that the valve members 78 and 80 are urged into sealing engagement with their associated fluid outlets when pressure Pc is acting against their end surfaces 130 and 132. The movement of the valve members 78 and 80 is opposed by the pressure Po acting against the opposite end sections of each valve member, and, as herebefore mentioned, Po is approximately one-half of Pc; thus, the valve members 78 and 80 are pressure unbalanced toward sealing engagement with their associated fluid outlets when pressure Pc is admitted into the pressure chambers 110 and 112.

As herebefore mentioned, the pressure chamber 88 associated with the valve member 76 is connected to the fluid inlet ahead of the sonic venturi, thus, fluid at a pressure Ps is always acting against the surface 98 for urging the opposite end surface 86 into sealing engagement with the fluid outlet 34. Opposing this movement is pressure Po which, as herebefore mentioned, is one-fourth of Ps, thus valve member 76 is also pressure unbalanced towards sealing engagement with its associated fluid outlet.

It should be noted that the end surfaces 130 and 132 are greater than the end surface 98, thus, when the pressure Pc is acting against the surfaces 130 and 132, the resultant force (tending to move the valve members 78 and 80 downward) is greater than the resultant force (due to the pressure Ps acting on surface 98), tending to move the valve member 76 downward. Since the valve members 76, 78, and 80 are mechanically linked by means of linking mechanism 54, valve member 76 will be forced upwardly away from its associated fluid outlet and valve members 78 and 80 will move downwardly toward engagement with their associated fluid outlets due to the greater resultant force acting thereon.

For example, if the flapper 146 is in the central position indicated by letter A, the fluid at pressure Pc entering through inlet port 152 will exit from the servo pilot 138 through both outlet ports 154 and 156 and will be directed to the pressure chambers 110 and 112 by means of conduits 168 and 170, respectively. The pressure Pc in chambers 110 and 112 will act against the surfaces 130 and 132, respectively, to urge the valve members 78 and 80 into sealing engagement with the fluid outlets 36 and 38, respectively.

Since the resultant force acting on valve members 78 and 80 is greater than the resultant force acting on valve member 76, valve members 78 and 80 will seat against their associated fluid outlets and simultaneously force valve member 76, by means of linking mechanism 54, off its associated fluid outlet, thus establishing fluid communication between the fluid inlet 32 and the fluid outlet 34.

If the flapper 146 is shifted to a rightwardly position as indicated by the letter B, the fluid entering the outlet port 154 will be restricted in a manner as herebefore described, while fluid will flow through outlet 156 to pressure chamber 112. The fluid at pressure Pc in pressure chamber 112 will act against the end surface 132 of valve member 80 urging the same into sealing engagement with fluid outlet 38. Simultaneously, the fluid at pressure Ps in pressure chamber 88 will act against the surface 98 of valve member 76 urging the same into sealing engagement with fluid outlet 34. Due to the restriction of flow through outlet port 154, the pressure in pressure chamber 110 will be substantially less than in pressure chamber 112, thus, the valve members 76 and 80 will simultaneously move downwardly into sealing engagement with their associated fluid outlets and force valve member 78 upwardly from outlet 36 by means of the linking mechanism 54, thus establishing fluid communication between the fluid inlet 32 and the fluid outlet 36. Fluid in pressure chamber 110 and conduit 168 will be collected into the fluid chamber 30 by means of conduit 172, thus, the internal leakage will be utilized for the output of the valve.

If the flapper 146 is shifted to a leftwardly position, as indicated by the letter C, the fluid entering the outlet port 156 will be restricted, while fluid will flow through outlet 154 to pressure chamber 110. Valve members 76 and 78 will seat against their associated fluid outlets, while valve member 80 will move upwardly to establish fluid communication between the fluid inlet 32 and the fluid outlet 38 in the same manner as described in establishing communication between the fluid inlet 32 and the fluid outlet 36. The fluid in pressure chamber 112 and conduit 170 will also be collected into the fluid chamber 30 to be utilized for the output of the valve.

It should be noted that at normal operating pressure in a typical high temperature propellant thrust application, the embodiment of the invention selected for illustration is relatively insensitive to propellant contamination since the minimum internal restriction of the pressure reducing orifices is approximately .060 inches in diameter.

It should be further noted that the electrically actuating means—solenoids 148 and 150—are located in a position which is relatively remote from the fluid chamber 30 and fluid inlet 32, thus minimizing the possibility of damage or inoperativeness of such electrical controls when extremely high temperature fluid is flowing through the valve chamber 30.

It will thus be seen that the present invention provides a rugged and compact directional control valve, capable of directing fluid selectively to a plurality of outlets and in which its construction allows the device embodying the invention to operate at much higher temperatures than conventional devices of the type herebefore mentioned, but with a minimum possiblity of damage.

It should also be noted that the present invention will operate with a minimum amount of electrical power consumption since only one control valve is required to selectively establish communication between the inlet and a plurality of outlets.

While the form of embodiment of the invention as herein disclosed constitutes a preferred form, it is to be understood that other forms might be adopted, all coming within the scope of the claims which follow.

I claim:

1. A directional flow valve comprising:
 a. a housing having a fluid inlet adapted to communicate pressure fluid with a plurality of fluid outlets;
 b. a plurality of valve means for closing communication between said fluid inlet and said fluid outlets, each valve means comprising:
  1. a pressure chamber; and
  2. a shiftable valve member, an end surface of which is disposed in said pressure chamber, said member being responsive to pressure acting on said end surface to close communication between said fluid inlet and one of said fluid outlets;
 c. means for mechanically connecting said valve members, said connecting means being pivotally carried by said housing;
 d. first means for forming a restriction in said fluid inlet to substantially reduce the pressure of said fluid beyond said first restriction means;
 e. passage means connecting one of said pressure chambers to said fluid inlet ahead of said first restriction;
 f. second means for forming a restriction, said second restriction means communicating with said fluid inlet and adapted to reduce the pressure of the fluid passing therethrough to a pressure greater than the pressure beyond said first restriction means and less than the pressure ahead of said first restriction means; and
 g. means for selectively connecting the pressure beyond said second restriction means to the other of said pressure chambers whereby said plurality of valve means may selectively close communication between said fluid inlet and said plurality of fluid outlets.

2. A combination as in claim 1 including a fluid chamber, said fluid chamber connecting said plurality of outlets to said inlet wherein said selectively connecting means is remote from said fluid chamber.

3. A combination as in claim 1 wherein the end surfaces associated with said other pressure chambers each have an effective pressure responsive area greater than the effective pressure responsive area of the end surface associated with the said one pressure chamber.

4. A combination as in claim 3 wherein the effective pressure responsive area of the end surfaces associated with the said other pressure chambers are substantially equal in magnitude.

5. A combination as in claim 1 wherein said mechanically connecting means comprises:
 a pivot fulcrum;
 a linking mechanism, said mechanism being pivotally carried by said fulcrum;
 said valve means being circumferentially spaced around said fulcrum; and
 said valve members being pivotally carried by said linking mechanism whereby said valve members are mechanically linked.

6. A combination as in claim 1 wherein:
 a. said plurality of valve means comprises a first valve means, a second valve means and a third valve means, said one of said pressure chambers being associated with said first valve means;
 b. said selectively connecting means having an inlet port and two outlet ports, said connecting means being adapted to selectively connect fluid from said inlet port to either of said outlet ports;
 c. passage means for connecting one of said outlet ports to the pressure chamber associated with said second valve means and the other of said outlet ports to the pressure chamber associated with said third valve means; and
 d. said inlet port being connected to the pressure beyond said second restriction means.

7. A combination as in claim 6 wherein said fluid inlet is connected to said plurality of fluid outlets by means of a fluid chamber formed in said housing:
 said pressure chamber associated with said second valve means being connected to said fluid chamber by means of a first restricted passageway; and
 said pressure chamber associated with said third valve means being connected to said fluid chamber by means of a second restricted passageway.

8. A combination as in claim 7 wherein said selectively connecting means being an electrically actuated servo valve adapted to selectively communicate said inlet port with said outlet ports, said selectively connecting means being remote from said fluid chamber.